Sept. 13, 1966          R. W. NEWELL          3,271,932
              ELECTROSTATIC PRECIPITATOR
                 Filed July 21, 1965
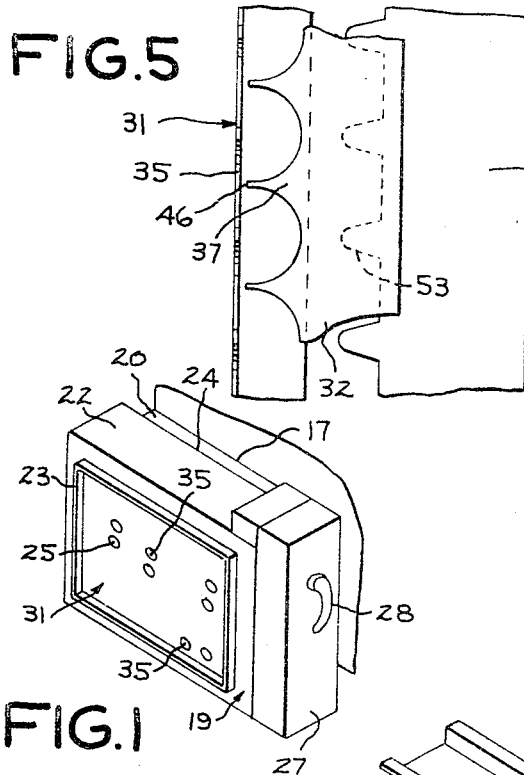
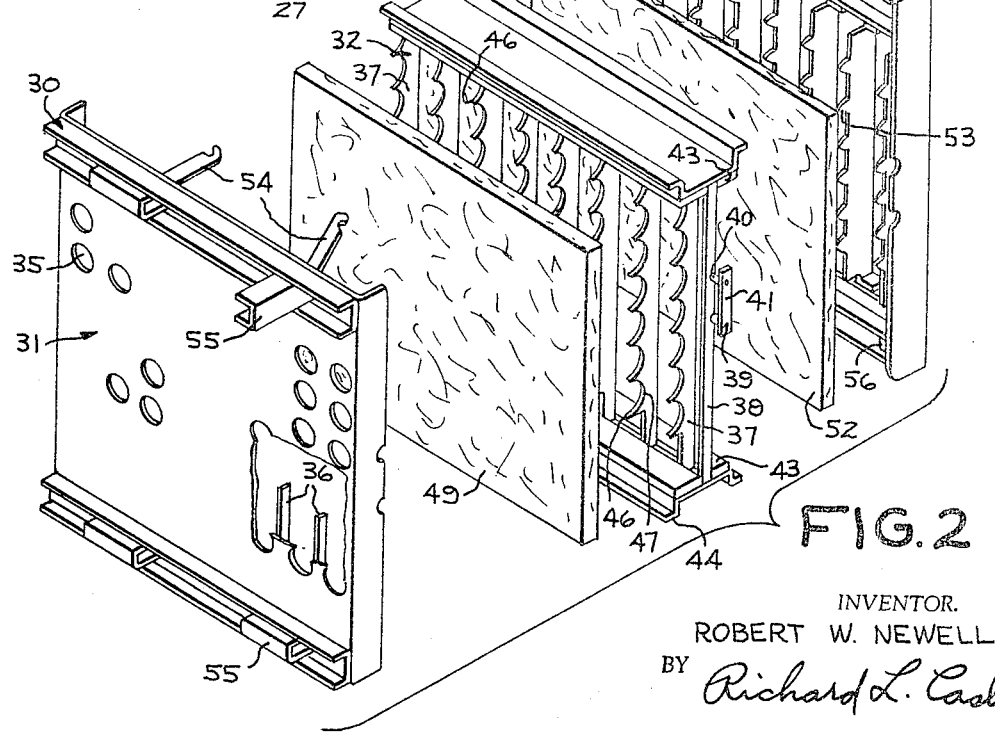
INVENTOR.
ROBERT W. NEWELL
BY Richard L. Caslin
HIS ATTORNEY United States Patent Office 3,271,932
Patented Sept. 13, 1966

3,271,932
ELECTROSTATIC PRECIPITATOR
Robert W. Newell, Yardley, Pa., assignor to General
Electric Company, a corporation of New York
Filed July 21, 1965, Ser. No. 473,632
8 Claims. (Cl. 55—132)

This is a continuation-in-part application of my now abandoned application Serial No. 408,857, filed on November 4, 1964, and assigned to the General Electric Company, the assignee of the present invention.

The present invention relates to a design of electrostatic precipitator for the removal of particulate matter from a gas stream, and particularly to such a precipitator for use as an air cleaner in the return air duct of a warm air furnace and/or air conditioning systems. Other applications include attachment to room air conditioners, air circulating fan units and portable air circulating units.

Electrostatic precipitators have been widely used in industrial applications for many years to provide a highly efficient filtering action with no moving parts. One of the major problems that exists in precipitators for air cleaning applications is the chore of removing the particulate material that collects within the precipitator. Most of the commercial designs of domestic units supply separate electrode washing facilities which are costly, take up a great deal of space and require the handling of heavy components which could not be managed by the average housewife. It is designed for use with central residential heating and/or cooling systems, and it may be added to an existing system.

The principal object of the present invention is to provide an electrostatic precipitator with a removable filter unit of high operating efficiency that is small in size and light in weight with ground potential electrodes of large surface area, as well as at least one disposable filtering media used for collection of the charged particles.

A further object of the present invention is to provide an electrostatic precipitator with a removable filter unit comprising easily separable parts such as ground potential electrodes, particle charging electrodes and a porous collecting and filtering media combined therewith.

A further object of the present invention is to provide an electrostatic precipitator with a removable filter unit having two elements with large surface areas that provide the ground potential and polarity, and an intermediate particle charging grid adapted to be connected to a high voltage source of direct current, there being at least one layer of porous media that provides the collecting and filtering means between the charging grid and one of the ground potential elements.

A still further object of the present invention is to provide an electrostatic precipitator with an optimum geometric relationship between each of the tips of the high voltage charging electrodes and a circular aperture of a ground potential plate arranged upstream thereof.

The present invention, in accordance with one form thereof, is embodied in an electrostatic precipitator having an outer casing with a gas inlet and a gas outlet. Within the casing is a removable filter unit comprising at least an upstream ground potential plate adjacent the gas inlet and a high voltage charging grid immediately downstream of the ground potential plate. This ground potential plate has a plurality of circular apertures and provides the necessary ground potential required for the charging of the entrained particles while the high voltage charging grid is directly connected to a high voltage source of direct current. This charging grid includes a plurality of spaced electrodes where each electrode has a plurality of spikes. The tip of each spike has a definite configuration required for proper corona effect and it is adapted to be located adjacent the center of one of the apertures so as to create an ionized field for the purpose of charging the particles in the gas stream passing through this field from the spike tip to the edge of the circular aperture. Another improvement that adds to the efficiency of the filter unit is a ground potential grid downstream of the multi-tip charging grid. Also at least one layer of porous collecting and filtering media would be interposed either between the charging grid and this downstream ground potential grid and/or between the charging grid and the upstream ground potential plate with the apertures.

An electrostatic precipitator or air cleaner of the class described is capable of removing or collecting particulate matter having a size from .05 micron to 100 microns, where a micron is equal to about .00004 of an inch. A human hair is about 100 microns in diameter. On the basis of weight, most of the air we breathe contains particles above 5 microns in size; while on the basis of numbers about 99% of all air borne particles are below 5 microns in size. The heavier particles tend to settle out of the air naturally, while the lighter ones remain air borne and are part of the air we breathe. Examples of particulate matter by micron size are cigarette smoke .1 to .01 micron; bacteria, mold and fungus spores 1 to 5 microns; pollen 10 to 100 microns; and dust, fly ash, fog, mist and lint all fall in a range from 5 to over 100 microns in diameter depending upon the character of the specific atmosphere.

My invention will be better understood from the following description taken in conjunction with the accompanying drawing and its scope will be pointed out in the appended claims.

FIGURE 1 is a perspective view of an electrostatic precipitator embodying the present invention;

FIGURE 2 is an exploded view of a removable filter unit that is adapted to be assembled within the casing of the electrostatic precipitator of FIGURE 1;

FIGURE 3 is a fragmentary view of the filter unit of FIGURE 2 looking through several of the circular apertures of the upstream ground potential plate to compare the geometric relationship of the tips of the spikes of the electrodes of the high voltage charging grid that are centered therein;

FIGURE 4 is a cross-sectional view through the filter unit taken on the line 4—4 of FIGURE 3; and FIGURE 5 is a cross-sectional view through the removable filter unit taken on the lines 5—5 of FIGURE 4, but with the two filtering media removed.

Turning now to a consideration of the drawing and in particular to FIGURE 1, there is shown an electrostatic precipitator 19 adapted to be mounted in a section of a cold air return duct adjacent a furnace return opening. The precipitator 19 is provided with a hollow housing or casing 22 of generally box-like construction with opposite walls 23 and 24 containing a gas inlet 25 in wall 23 and a gas outlet (not shown) in wall 24. One end of the casing 22 is provided with a removable cover 27 of box-like configuration which contains the electrical power supply as well as provides a releasable means for making electrical contact between the power supply and the removable filter unit of FIGURE 2. The cover 27 includes a pivoted handle 28 for making a mechanical connection between the cover 27 and casing 22 as well as an electrical connection between the power supply and the removable filter unit, but these features are not completely illustrated as they do not form part of the present invention.

FIGURE 2 of the drawing shows an exploded view of a removable filter unit 30 that is made up of several parts and fastened together as a single assembly that may be moved into and out of the casing 22 once the door 27 has been hinged, slid or otherwise moved away from the front of the casing 22. The main elements of the filter unit 30 are shown as comprising an upstream ground potential plate 31, a high voltage charging grid 32 and a downstream ground potential grid 33. The upstream ground potential plate 31 is adapted to be located adjacent the gas inlet opening 25, while the downstream ground potential grid 33 is adapted to be located adjacent the gas outlet. The three elements 31, 32 and 33 of the filter unit 30 are made of light weight, conductive sheet metal such as aluminum or steel. Both the upstream plate 31 and the downstream grid 33 are arranged at ground potential, while the charging grid 32 is insulated therefrom and adapted to be connected to a high voltage source of direct current; for example, 6000 volts and 3.5 milliamperes. The upstream plate 31 is provided with a plurality of circular apertures 35 which nearly cover the entire area of the plate and are arranged in orderly fashion of ranks and files in order to minimize the air pressure drop through the precipitator. The innermost surface of the upstream plate 31 is provided with a plurality of parallel vanes 36 as best seen in FIGURE 4 which are interposed between adjacent rows of apertures 35 to increase the ground potential surface area of the upstream plate.

The high voltage charging grid 32 is provided with a plurality of parallel electrodes 37 which are supported in a frame-like member that terminates in a bus bar 38 that includes a pair of similar terminals 39 which are each of bolt-like form surrounded by an insulator 40 and connected together at their ends by a short bar 41. This type of double terminal 39 has been adapted so that the filter unit 30 may be installed within the casing 22 in either an upright or an inverted position depending upon the direction of flow of the gas through the precipitator 19. The frame member of the charging grid is provided with high voltage insulators 43 at the top and bottom thereof to insulate the grid 32 from both a top and bottom supporting hat-shaped channel member 44 which serve as the support means for the entire filter unit 30. Thus, it will be understood that a high potential difference exists between the charging grid 32 and the upstream ground potential plate 31 and the downstream ground potential grid 33.

Each electrode 37 of the charging grid is formed by a flat metal strip having a leading edge provided with a series of spikes 46 formed by cutting semi-circular shapes or serrations 47 in the leading edge, and leaving only a spike 46 therebetween having a definite square shape or cross-section on its end. As can be seen in FIGURES 3 and 4, the tip of each spike 46 is precisely located generally within the center of the plane of the circular aperture 35. For optimum results it has been found critical to shape the transverse cross-section of the tip as a square where the corners of the square are each an equal distance from the edge of the circular aperture 35 as is best seen in FIGURE 3, so as to create an equal stress field between the tip of the spike 46 and the edge of the aperture 35. The application of a suitable potential defference between the tips of the spikes of the electrodes 37 results in the electrical charging of the gas stream close to the tips due to high electrostatic field stress in this region. This condition which is accompanied by a blue glow surrounding the tip is that which constitutes the corona and it is necessary for the successful operation of a precipitator. Hence, the dust particles borne by the gas are electrostatically charged by passing them through the ionized field produced in the corona discharge from each tip to the edge of the related aperture 35. A large number of ions are produced by the electrostatic field, and an effective transfer of an electrical charge takes place from these ions to the dust particles. Then the charged particles are attracted and travel toward the opposite potential impressed upon the vanes 36 of the upstream plate 31 and the vanes 51 of the downstream grid 33.

The charging electrodes may have either a positive or negative potential. Some of the factors which determine the amount of electrical charge impressed upon the particles is the strength of the charging field, the surface area and dielectric properties of the particles, the time during which a particle is subject to the charging action, the characteristics of the gas and the temperature and humidity of the gas. When a dust particle is charged in the electrostatic field; it travels toward the ground potential of opposite polarity. The path of the particle in moving toward the opposite charge on the ground potential elements tends to pass through a filtering media 49 of porous dielectric material such as fiber glass that is interposed between the upstream plate 31 and the charging grid 32, as is best seen in FIGURE 4. Because of the alternating, spaced relationship between the electrodes 37 of the charging grid 32 and the vanes 36 of the upstream plate 31, the filtering media 49 assumes a corrugated form as is best seen in FIGURE 4. It should be understood that the tips of the spikes 46 pierce this filtering media 49 so as to substantially coincide with the center of each circular aperture 35.

The downstream grid 33 is a frame-like member having a plurality of parallel vanes 51 which, as seen in FIGURE 4, are generally in line with the vanes 36 of the upstream plate 31. A second layer of porous filtering media 52 is shown interposed between the charging grid 32 and the downstream grid 33. The vanes 51 nest or telescope slightly with respect to the electrodes 37 of the charging grid 32 so that the second media 52 also assumes a corrugated shape in a manner similar to the first media 49. The vanes 51 of the downstream grid 33 also present a large surface area at ground potential to reinforce and extend the attracting force action of the upstream plate 31 and downstream grid 33. The front or leading edge of each vane 51 is provided with a plurality of teeth 53 so as to increase the efficiency of the particle collecting action. The teeth pierce the media 52 and also force the media deeply between the high voltage discharge electrodes 37. Plain vanes were first used in this design but they have been superseded by the toothed vanes described above. The increased efficiency is believed due to the increased field strength gained because of additional surface area or material of the teeth at ground potential placed between the discharge electrodes. Preferably the teeth 53 are blunt for the use of sharp teeth would cause a corona discharge to occur at the downstream grid 33 where it would lower the efficiency by altering the charging current characteristics at the discharge electrodes. Moreover, the distance between adjacent teeth, commonly known as the pitch of the teeth has been chosen to correspond with the pitch of the spikes 46 of the discharge electrodes 37, but to be alternated therewith by being equally spaced therefrom as is best seen in FIGURE 5.

A suitable fastening means is provided to hold the filter unit 30 in a unitary assembly. For example, a plurality of pivoted latch members 54 are provided on the upstream plate 31 and each has a handle portion 55 which is adapted to manipulate the latch for engagement with a keeper or lock pin 56 on the downstream grid 33 as is best seen in FIGURE 2. As shown, there are four such latch members two being located at the top of the upstream plate 31 and two at the bottom.

By using the electrostatic attraction principle that of those particles containing a charge of electricity, like charges of electricity repel each other and unlike charges attract each other, the air in the home may be filtered of dust particles. A dust particle is negatively charged if it has an excess of electrons, or miniature electric charges. Moreover, the high voltage charging grid adds electrons to the dust particles in the electrostatic field created by the voltage difference between the charging grid and the ground potential plate. The dust is swept past the charging grid by the air flow of the air circulating system and the dust is drawn toward a downstream ground potential grid and is intercepted by filtering media interposed between the various elements.

Having described above the design of an electrostatic precipitator embodying the present invention it will readily be apparent to those skilled in this art that I have devised a simple, compact, light weight filtering unit 30 capable of providing continuous operation which is easy to assemble and to disassemble for replacing the filtering media 49 and 52 and for cleaning the small deposits on the upstream ground potential plate 31 and the downstream grid 33. As an economy measure the first filtering media 49 may be omitted and sole reliance made of the second media 52; or, the second media 52 and the downstream grid 33 may be omitted for economy in a low efficiency version of this invention.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. An electrostatic precipitator comprising a casing having a gas inlet and outlet, a removable filter unit within the casing comprising an apertured plate at ground potential positioned adjacent the gas inlet, a high voltage charging grid member supported in the casing adjacent the apertured plate and insulated from the other members, and a downstream grid at ground potential arranged between the high voltage charging grid member and the gas outlet, and fastening means for holding the apertured plate, the high voltage charging grid member and the downstream grid together, the innermost surface of the apertured plate including a plurality of parallel vanes spaced between the apertures, the high voltage charging grid member formed by a plurality of parallel electrodes arranged generally in parallel with the vanes of the apertured plate but intermediate thereof, said electrodes having a leading edge with a plurality of spikes having tips that are adapted to be centered within the apertures of the said plate, the downstream grid being formed with a plurality of parallel vanes generally in line with the vanes of the apertured plate, one sheet of porous dielectric filtering media sandwiched between the vanes of the apertured plate and the electrodes of the high voltage charging grid member, and a second sheet of similar filtering media sandwiched between the electrodes of the high voltage charging grid member and the downstream grid, whereby a substantially uniform ionized field is produced by an electrostatic field from each of the tips of the spikes of the said electrodes to the edges of the nearest aperture of the said plate so as to impress an electrostatic charge on any dust particles entrained in the gas that is caused to flow through the precipitator.

2. An electrostatic precipitator for filtering particles in a gas stream comprising a casing having a gas inlet and an outlet, a removable filter unit within the casing comprising an apertured plate adjacent the gas inlet, a downstream grid adjacent the gas outlet and a charging grid member interposed between the apertured plate and downstream grid, and a layer of porous filtering media sandwiched between the apertured plate and the charging grid member, and a similar layer of filtering media sandwiched between the charging grid member and the downstream grid, and releasable fastening means for holding the filter unit together, both the apertured plate and downstream grid being at ground potential while the charging grid member is adapted to be connected to a source of high voltage direct current, the apertured plate being provided with a plurality of circular apertures arranged on generally parallel center lines, the charging grid member having a plurality of parallel electrodes aligned with respect to the parallel center lines of the apertured plate, each electrode having a plurality of spikes extending through the first-mentioned filtering media, each spike having a tip centered closely adjacent one of the apertures, the downstream grid having a plurality of parallel vanes arranged intermediate the said parallel electrodes, whereby a substantially uniform ionized field is produced by an electrostatic field from each of the tips of the parallel electrodes to the edges of the adjacent apertures so as to impress an electrostatic charge on the particles in the gas stream passing through the filter unit and precipitate the particles on the filter unit.

3. An electrostatic precipitator for filtering dust particles from a gas stream comprising a casing having a gas inlet and outlet, a filter unit within the casing comprising an apertured plate adjacent the gas inlet and a charging grid member downstream of the apertured plate, and a layer of porous filtering media sandwiched between the apertured plate and the charging grid member, the apertured plate being provided with a plurality of circular apertures, the charging grid member having a plurality of spaced substantially parallel planar electrode vanes, each electrode vane having a plurality of spikes which extend through the filtering media, each spike having a tip located closely adjacent the center of one of the apertures in the said plate, the charging grid member being adapted to be connected to a high voltage direct current power supply while the apertured plate is at ground potential to establish a suitable potential difference between the electrodes and the apertured plate so there is an electrostatic field from the tip of the electrodes to establish an ionized field pattern between each tip and the edges of the adjacent aperture.

4. An electrostatic precipitator as recited in claim 3 where the innermost side of the apertured plate is provided with a plurality of spaced vanes interposed between the apertures and engageable with the filtering media so as to arrange the filtering media in corrugated form at a short distance from the apertures of the said plate.

5. An electrostatic precipitator as recited in claim 4 wherein the filter unit includes a downstream grid at ground potential having a plurality of spaced vanes generally nested between the spaced electrodes of the charging grid member, and a layer of porous filtering media interposed between the said charging grid member and the downstream grid.

6. An electrostatic precipitator for filtering dust particles from a gas stream comprising an outer casing with opposite side walls having a gas inlet in one wall and a gas outlet in another wall, a filter unit mounted in the casing and comprising an apertured plate adjacent the gas inlet, a charging grid and finally a downstream grid adjacent the gas outlet, a layer of filtering media sandwiched between the charging grid and the downstream grid, and fastener means for holding the filter unit together, both the apertured plate and the downstream grid being at ground potential while the charging grid is adapted to be connected to a high voltage source of direct current, the apertured plate being provided with a plurality of circular apertures, the charging grid having a plurality of spaced substantially parallel planar electrode vanes where each electrode vane has a plurality of spaced spikes, each spike has a tip of generally square shape in transverse cross-section that is centered within the plane of one of the apertures so as to establish an ionized field at each aperture produced by an electrostatic field between the tip of the electrode spike and the circular edge of the aperture.

7. An electrostatic precipitator for filtering particulate matter from an air stream comprising an outer casing with walls forming an air inlet and an air outlet, a removable filter unit positioned within the casing and including an apertured plate adjacent the air inlet, a charging grid intermediate of the casing, and a downstream grid adjacent the air outlet, fastening means for holding these parts together, both the apertured plate and the downstream grid being at ground potential while the charging grid is adapted to be impressed with a high voltage direct current, the innermost side of the apertured plate having a plurality of parallel vanes each interposed between adjacent rows of apertures, the charging grid having a plurality of parallel electrode vanes out of alignment with the vanes of the apertured plate, the front edge of each electrode vane having a plurality of uniformly spaced spikes where each spike has a tip located closely adjacent the center of one of the apertures in the said plate, and a layer of porous filtering media sandwiched between the vanes of the apertured plate and the electrode vanes of the charging grid, the said downstream grid also having a plurality of parallel vanes generally in line with the vanes of the apertured plate, the front edge of each vane of the downstream grid having a plurality of teeth where the teeth are out of alignment with the spikes of the discharge electrode vane, and a layer of porous filtering media interposed between the electrode vanes of the charging grid and the front edges of the downstream grid, portions of the downstream grid vanes being nested between the discharge electrode vanes so that the second filtering media assumes a corrugated configuration.

8. An electrostatic precipitator for filtering particulate matter from an air stream comprising a hollow casing with walls forming an air inlet and an air outlet, a removable filter unit positioned within the casing and including an apertured plate adjacent the air inlet, a charging grid intermediate of the casing, and a downstream grid adjacent the air outlet, both the apertured plate and the downstream grid being at ground potential while the charging grid is adapted to carry a high voltage direct current, the innermost side of the apertured plate having a plurality of parallel vanes each interposed between the adjacent rows of apertures, the charging grid having a plurality of parallel electrode vanes intermediate the vanes of the apertured plate, the front edge of each electrode vane having a plurality of uniformly spaced spikes where each spike has a tip located closely adjacent the center of one of the apertures in the said plate, and a layer of porous filtering media sandwiched between the vanes of the apertured plate and the electrode vanes of the charging grid and pierced by said spikes, the said downstream grid also having a plurality of parallel vanes interposed between the electrode vanes of the charging grid, the front edge of each vane of the downstream grid having a plurality of blunt teeth where the teeth are of the same pitch as the pitch of the spikes of the electrode vanes of the charging grid but intermediate thereof, and a layer of porous filtering media interposed between the electrode vanes of the charging grid and the front edges of the vanes of the downstream grid, and a second porous filtering media interposed between the electrode vanes and the front edge of the downstream grid vanes, the said second media being deeply corrugated between the electrode vanes.

References Cited by the Examiner

UNITED STATES PATENTS 2,297,601    9/1942    Williams    55—132
2,579,445   12/1951    Warburton   55—131

OTHER REFERENCES

German printed application 1,078,096, March 1960.
German printed application 1,155,422, October 1963.

ROBERT F. BURNETT, *Primary Examiner.*